United States Patent [19]

Johnson et al.

[11] Patent Number: 5,832,220
[45] Date of Patent: Nov. 3, 1998

[54] AUTOMATIC SETTTING OF AN ACKNOWLEDGEMENT OPTION BASED UPON DISTRIBUTION CONTENT IN A DATA PROCESSING SYSTEM

[75] Inventors: William J. Johnson, Flower Mound; Robert P. Welch, Colleyville, both of Tex.

[73] Assignee: International Business Machines Corp., Armonk, N.Y.

[21] Appl. No.: 56,689

[22] Filed: Apr. 30, 1993

[51] Int. Cl.$^6$ ..................................................... G06F 17/30
[52] U.S. Cl. ................... 395/200.36; 395/200.75; 707/104
[58] Field of Search ..................... 395/600, 200, 395/100, 195, 149, 155, 161, 650, 159, 200.36, 200.75; 364/401, 406, 419.2; 707/1–4

[56] References Cited

U.S. PATENT DOCUMENTS

| | | | |
|---|---|---|---|
| 4,807,154 | 2/1989 | Scully et al. | 395/161 |
| 5,125,075 | 6/1992 | Goodale et al. | 395/200 |
| 5,181,162 | 1/1993 | Smith et al. | 364/419 |
| 5,247,661 | 9/1993 | Hager et al. | 395/600 |
| 5,276,869 | 1/1994 | Forrest et al. | 395/600 |
| 5,317,683 | 5/1994 | Hager et al. | 395/145 |

OTHER PUBLICATIONS

Method of confirming selected activities by recipients of electronic mail, Inventors: Heyen, et al., IBM Document No. AT988031 Oct., 1990.

*Primary Examiner*—Thomas G. Black
*Assistant Examiner*—Hosain T. Alam
*Attorney, Agent, or Firm*—Geoffrey A. Mantooth

[57] ABSTRACT

In a data processing system that allows the creation and transmission of distributions from a first user to a second user on the data processing system, the present invention automatically provides for the distribution an acknowledgement option based upon the contents of the distribution. The acknowledgement option causes an acknowledgement message to be sent back to the sender upon a specified event, such as the recipient receiving or acting on the distribution. After the first user has created the distribution and commanded the data processing system to send the distribution, the distribution is automatically searched for a predetermined content. If the predetermined content is found in the distribution, then a predetermined acknowledgement option is associated with the distribution. The distribution, along with the acknowledgement option, is then sent to the second user. If the predetermined content is not found, then the distribution is sent to the second user without the acknowledgement option.

18 Claims, 3 Drawing Sheets

AUTOMATIC SETTTING OF AN ACKNOWLEDGEMENT OPTION BASED UPON DISTRIBUTION CONTENT IN A DATA PROCESSING SYSTEM

TECHNICAL FIELD OF THE INVENTION

The present invention relates to distributions in data processing systems, and more particularly to the provision of acknowledgement options that allow acknowledgements of receipt of distributions.

BACKGROUND OF THE INVENTION

Data processing systems used in office environments commonly connect multiple user interfaces together in a network. Users at the user interfaces are able to communicate with each other by way of distributions sent over the network. Distributions include electronic mail, messages, documents, notes, etc.

A sender of a distribution may wish to know if the designated recipient has either received or acted on the distribution. For example, an organization, such as a company, may require that a distribution containing confidential information be acknowledged by the recipient whenever the distribution is sent outside of the company. Such a requirement provides protection against the loss of confidential information.

Prior art distributions on data processing systems permit the sender of a distribution to manually set an acknowledgement option. After the distribution is sent and upon the occurrence of a specified event, the acknowledgement option creates an acknowledgement message or signal that is sent back to the sender. An example of an acknowledgement option is a confirmation of delivery (COD) acknowledgement option. There are two types of confirmation of delivery acknowledgement options. One type sends an acknowledgement message back to the sender when the distribution is received by the recipient's system (for example, when a server receives the distribution). The other type sends an acknowledgement message back to the sender when the recipient opens the distribution.

The sender who desires an acknowledgement manually sets the acknowledgement option when the distribution is sent over the data processing system. This is accomplished by the user deciding which distribution should bear an acknowledgement option. Having the user decide which distribution should bear an acknowledgement option can result in the user forgetting to set an acknowledgement option. It can also be distracting to a user to have to remember to set an acknowledgement option and to determine the type of acknowledgement option which is to be used. Alternatively, the user can select the acknowledgement option as a persistent option that takes effect for all subsequently sent distributions. The use of the persistent acknowledgement option sets the acknowledgement option irregardless of the content or destination of the distribution.

It is desirable to have the data processing system automatically set an acknowledgement option on a distribution based on the automatic detection of the contents of the distribution. Such a capability would free a user for other tasks and would ensure that an acknowledgement option would be set when required.

SUMMARY OF THE INVENTION

It is an object of the present invention to provide a method and system for automatically setting an acknowledgement option upon the detection of a predetermined content within a distribution.

The present invention provides a method and system for automatically setting an acknowledgement option for a distribution on a data processing system. The present invention searches a distribution for a predetermined content. If the predetermined content is found in the distribution, then an acknowledgement option is associated with the distribution before the distribution is sent.

The present invention automatically provides an acknowledgement option for a distribution based upon the content of that distribution. After a user creates a distribution, the user commands the data processing system to send the distribution to the recipient. Before the distribution is actually sent, the distribution is searched for a predetermined content, such as one or more strings. If the distribution is found to contain the predetermined content, then a predetermined acknowledgement option is associated with the distribution. The distribution, along with the acknowledgement option, is then sent to the recipient. If the distribution does not contain the predetermined content, then it is sent to the recipient with its acknowledgement option status unchanged. The acknowledgement option causes an acknowledgement message or signal to be sent back to the sender upon a specified event, such as the recipient receiving or acting on the distribution.

The specific content or contents of a distribution that results in an acknowledgement option being set can be determined by the user. The user can edit the acknowledgement option setting content by adding, changing or deleting. The user can also specify the type of acknowledgement option that is set. Thus, the user can preprogram the types of content that produce a setting of an acknowledgement option. The user can compose the distribution to specifically include the acknowledgement option setting content.

In addition, the distribution can be searched for a first content, and if found, a first acknowledgement option is set. The same distribution can also be searched for a second content, and if found, a second acknowledgement option is set. If neither the first content or the second content is found, then no acknowledgement option is set and the distribution is sent to the recipient with its acknowledgement option status unchanged.

BRIEF DESCRIPTION OF THE DRAWINGS

FIG. 2 shows the method for registering the contents of a distribution which are to be searched for.

FIG. 3 shows the method for automatically searching a distribution and setting an acknowledgement option.

DESCRIPTION OF THE INVENTION

Figure 1:
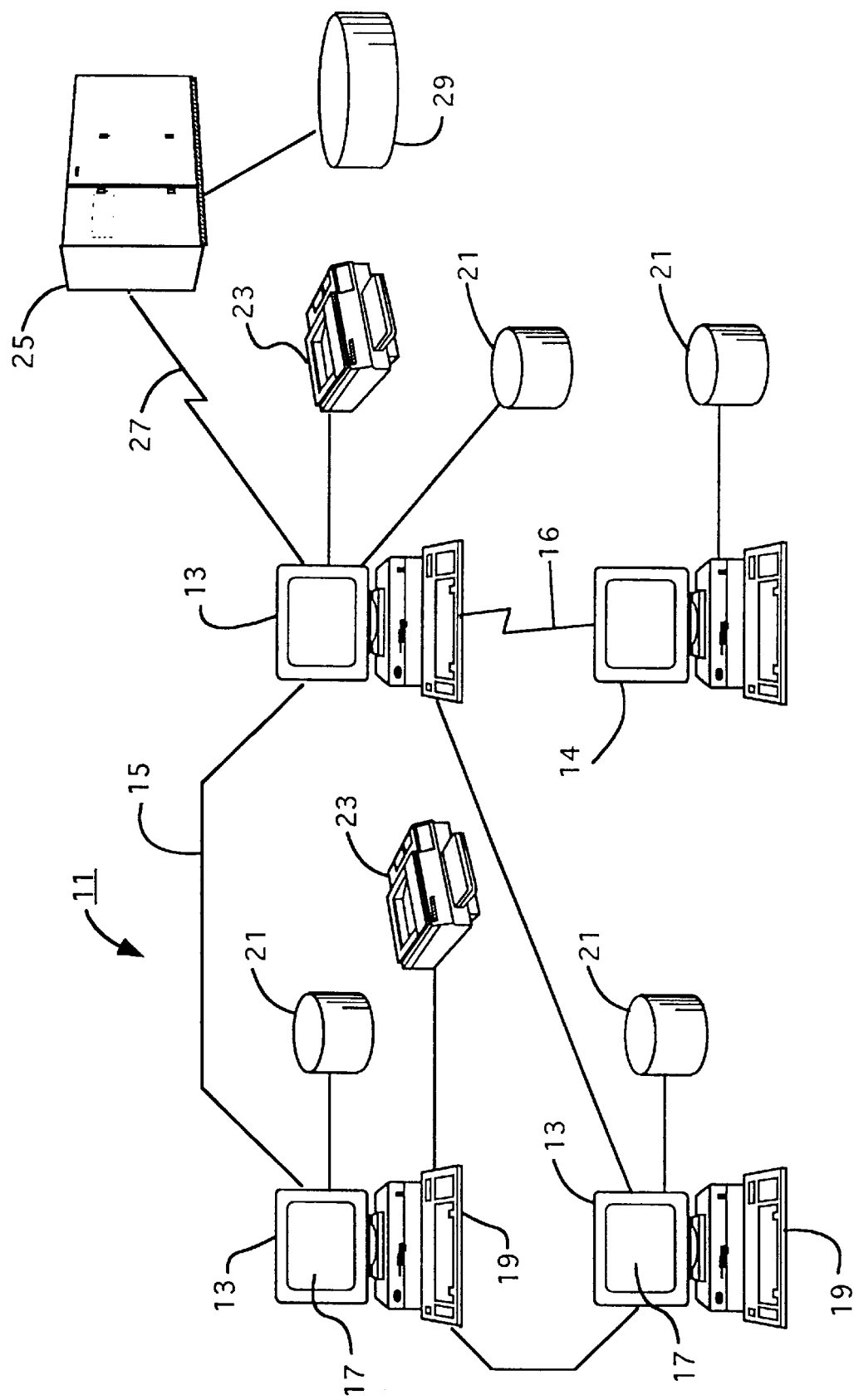
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers 13 which are connected together in a local area network (LAN) 15. In addition, one or more computers 14 are connected to the LAN 15 by way of a communications link 16.

Each computer 13 includes a user interface, which has a display screen 17 and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe computer 25 that is coupled to one of the computers by a communication link 27. The mainframe computer 25 may also be coupled to a storage device 29 which may serve as a remote storage for the computers.

The data processing system 11 has the elements necessary for sending distributions between various computers 13, 14, 25. A distribution can be electronic mail, a message, a document, a note, etc. Thus, a user of one computer (for example computer 13) is able to compose a distribution and send it to a recipient user on another computer (for example computer 14).

The present invention checks each distribution before it is sent for a specified content, and if found, sets a specified acknowledgement option for the distribution. When the distribution arrives at its destination, the acknowledgement option causes an acknowledgement to be implemented. For example, if the acknowledgement option is of the confirmation of delivery to recipient type, then the acknowledgement will be implemented upon the recipient opening the distribution. Implementation involves sending the acknowledgement message or signal back to the sender. The present invention allows a sender to select the content of a distribution which will trigger the setting of an acknowledgement option, as well as selection of the type of acknowledgement option.

The method of the present invention will now be described, referring to the flow charts of FIGS. 2 and 3. In the flow charts, the following graphical conventions are observed: a rectangle or parallelogram for either a process, function or screen display and a diamond for a decision. These conventions are well understood by programmers skilled in the art of data processing and user interfaces and the flow charts are sufficient to enable a programmer skilled in the art to write code in any suitable computer programming language, such as BASIC, PASCAL or C for a computer such as the IBM Personal System/2 (PS/2) family of computers which support these languages.

Figure 2:
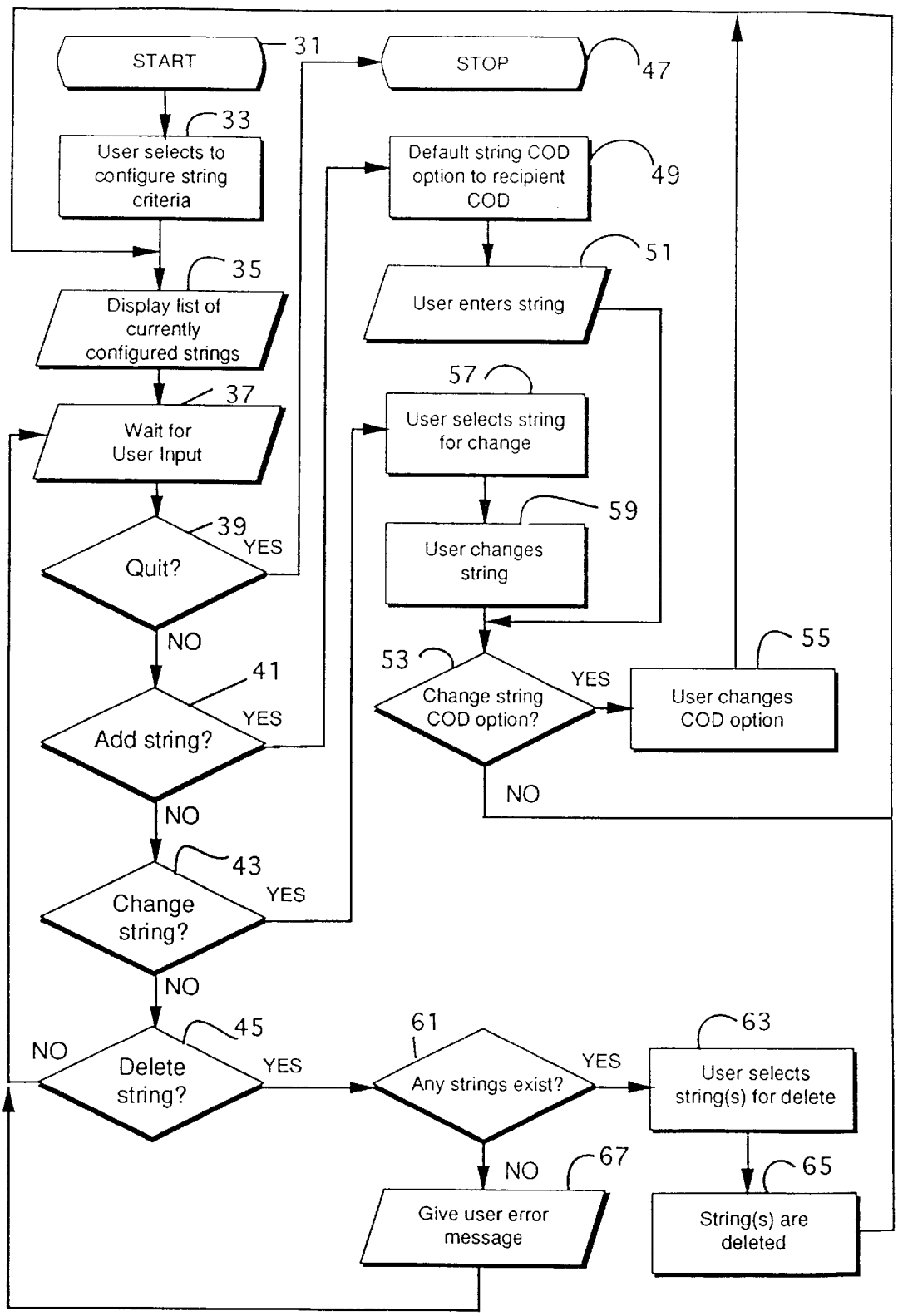
FIGS. 2 and 3 are flow charts showing the method of the present invention, in accordance with a preferred embodiment.

The flow chart of FIG. 2 illustrates the method of registering the contents of a distribution which are to be searched for. When a distribution is sent, the flow chart of FIG. 3 searches the distribution for one or more of the registered contents, and if found, sets an acknowledgment option.

Referring to FIG. 2, the method of registering content will be described. A user who wishes to add, change or delete content starts the computer, step 31 and selects the appropriate software to configure the contents, step 33. In the preferred embodiment, the contents that are configured are in the form of strings such as "CONFIDENTIAL", "DUE DATE", "DO IMMEDIATELY", or "John Jones" (who may be a particular designee or recipient).

In step 35, the list or table of currently configured strings is displayed to the user on the screen 17. If the user is configuring strings for the first time, the list may be empty unless there are provided default strings. A user can customize the list to serve the user's individual needs. If the list is too long to be displayed at one time, then the user can scroll the list on the display. In step 37, the method waits for an input from the user. The user uses the keyboard 19, mouse, or other input device.

Once a user input has been received, the method determines the type of input. Step 39 determines if the user input is to quit the registration process. Step 41 determines if the user input is to add a string. Step 43 determines if the user input is to change a string. Step 45 determines if the user input is to delete a string. If the user input is something else, then the method loops back to step 37 to await another user input.

If the user input is to quit, then the result of step 39 is YES, and the method proceeds to step 47, wherein the method stops.

If the result of step 39 is NO, the user does not wish to quit, then the method proceeds to step 41. In step 41, the method determines if the user input is to add a string. If the result of step 41 is YES, the user wishes to add a string, then the method proceeds to step 49. In step 49, the type of acknowledgement option is set to a default. In the preferred embodiment, the default type of acknowledgement option is a confirmation of delivery (COD) to a recipient. This type of acknowledgement option sends an acknowledgement when the recipient opens the distribution.

In step 51, the user enters the string which is to be added. Then, in step 53, the method determines if the type of acknowledgement option or COD option is to be changed. This is achieved by displaying a message to the user and waiting for an input. If the result of step 53 is YES, then the method proceeds to step 55, wherein the user changes the COD option. For example, the user could change the COD option to a COD to a server, wherein the acknowledgement is sent when the distribution is received by the recipient server. The method then proceeds back to step 35 to display the updated list. If the result of step 53 is NO, then the method proceeds directly to step 35.

If the result of step 41 is NO, the user does not wish to add a string, then the method proceeds to step 43. In step 43, the method determines if the user wishes to change a string. If the result of step 43 is YES, then the method proceeds to step 57, wherein the user selects from the list the string which is to be changed. In step 59, the user changes the string by providing the string information. The user changes the string by using the keyboard 19 and by observing the screen 17. After step 59, the method proceeds to step 53, wherein the user can change the COD option that is associated with the amended string. The updated list of configured strings is then displayed, step 35.

If the result of step 43 is NO, the user does not wish to change a string, then the method proceeds to step 45. In step 45, the method determines if a string is to be deleted. If YES, the method proceeds to step 61 to determine if any strings exist in the list. If the result of step 61 is YES, then the method proceeds to step 63, wherein the user selects the string or strings from the list which are to be deleted. Then, in step 65, the selected string or strings are deleted. After deletion, the method returns to step 35 to display the updated list.

If the result of step 61 is NO, no strings exist, then the user is given an error message, step 67. The method then returns to step 37 to await a user input.

Figure 3:
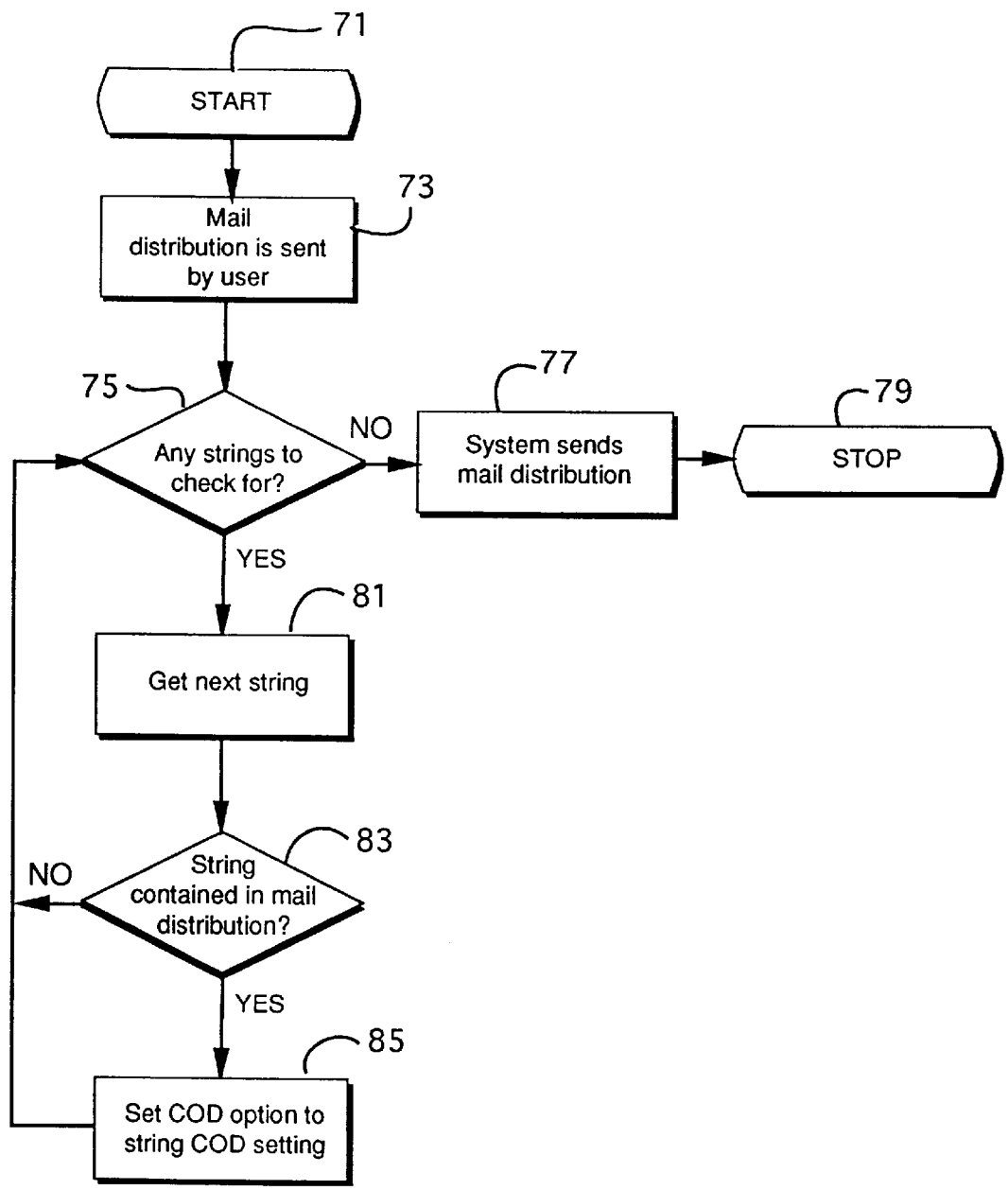

Referring now to FIG. 3, the automatic acknowledgement option setting method will be described. A user composes a mail distribution and then commands the data processing system to send the distribution. Before the distribution is sent to the recipient by the data processing system, the data processing system executes the method of FIG. 3. The method starts, step 71, and determines that a mail distribution is sent, step 73. For example, when a distribution is sent by the user, an interrupt could be generated, which interrupt serves to execute the method of FIG. 3.

In step 75, the method determines if there are any strings to check for. The method looks in the list of registered contents, which was configured by the method of FIG. 2, to determine if there are any strings that should be checked for. If there are NO strings in the list of registered criteria, then the system sends the mail distribution, step 77 and the method stops, step 79.

If step 75 determines YES, there are strings to be checked for in the distribution, then the method proceeds to step 81 to get the next (or first) string. The method obtains the string for the list of registered contents. The method also obtains from the list the type of acknowledgement option or confirmation of delivery option that is associated with the string. In step 83, the method determines if the string from the list is in the distribution. The method searches the attributes and contents of the distribution for the particular string. If the result of step 83 is YES, that is the distribution contains the particular string, then the method proceeds to step 85. In step 85, the method sets the confirmation of delivery (COD) option to the setting that is associated with the particular string.

After step 85, the method returns to step 75 to determine if the list of registered contents has another string to check for. Likewise, if the method cannot find the string in the distribution, a NO result in step 83, then the method returns to step 75.

If there are additional strings to search for, a YES result from step 75, then the method repeats steps 81–85, wherein the next string is obtained from the list of registered contents, the distribution is searched to find the string, and if the string is found, then the acknowledgement option is set. If there are no additional strings to check for, a NO result from step 75, then the system sends the distribution to the recipient, step 77.

As an example, the string "CONFIDENTIAL" is the next string in the list of registered contents. The acknowledgement option associated with "CONFIDENTIAL" is COD-recipient. In step 81, the method gets "CONFIDENTIAL" and its acknowledgement option of COD-recipient from the list. In step 83, the method searches the entire distribution for "CONFIDENTIAL". If the method finds "CONFIDENTIAL", then it sets the acknowledgement option to COD-recipient. The method then loops back to step 75 to determine if there are any additional strings to search for. If there are no additional strings to search for, then the system sends the mail distribution, step 77.

Continuing with the example, when the recipient of the distribution (which contains "CONFIDENTIAL") opens the distribution, then an acknowledgement message is sent to the sender based upon the COD-recipient attribute that is associated with the distribution.

Referring back to FIG. 2, when the user configures string criteria, the user is not limited to single strings. Plural strings, along with operators or conditions, can be configured. For example, the user can configure the following: STRING1 OR STRING2, wherein STRING1 and STRING2 are selected strings such as "CONFIDENTIAL" and "SECRET", respectively. Thus, when the method of FIG. 3 searches a distribution in step 83, if either STRING1 OR STRING2 are found, then the appropriate acknowledgement option will be set. Other operators can be used as well, such as AND, EXCLUSIVE OR, NAND, NOR and NOT. As another example, the following string configuration could be put into the list of registered criteria: (STRING1 OR STRING2) AND STRING3 AND (NOT STRING4). If in step 83, the conditions are met in the distribution, then an acknowledgement option will be set.

As another example, the user can enter the name of a recipient, such as "XYZ Company" in the list of registered contents, using the method of FIG. 2. Thus, whenever the user sends a distribution to XYZ Company, the user need only include the company's name in the distribution to be assured that an acknowledgement option will be set. This is easily done by addressing the distribution "To: XYZ Company".

The user can manually set an acknowledgement option with the present invention. Upon the user sending the distribution, the method of FIG. 3 executes.

The foregoing disclosure and the showings made in the drawings are merely illustrative of the principles of this invention and are not to be interpreted in a limiting sense.

What we claim is:

1. A method of providing an acknowledgment option for a distribution in a data processing system, said distribution being sent from a sender on said data processing system to a recipient on said data processing system, comprising the steps of:
   a) searching a distribution for a predetermined content; and
   b) if said predetermined content is found in said distribution, associating said acknowledgment option with said distribution before said distribution is sent to said recipient, said acknowledgment option creating an acknowledgment that is sent back to said sender after said distribution has been sent to said recipient and upon the occurrence of a specified event.

2. The method of claim 1 further comprising the step of allowing a user of said data processing system to provide said predetermined content.

3. The method of claim 2 further comprising the step of allowing said user to edit said predetermined content.

4. The method of claim 1 wherein said step of searching a distribution for a predetermined content further comprises the step of searching said distribution for a predetermined string.

5. The method of claim 1 further comprising the step of allowing a user of said data processing system to provide a type of acknowledgement option that is associated with said predetermined content.

6. The method of claim 1, wherein said step of searching a distribution for a predetermined content further comprises the step of searching said distribution for plural strings joined together with logical operators.

7. The method of claim 1 further comprising the step of, if after said step of searching said distribution said predetermined content cannot be found, then sending said distribution without said acknowledgment option.

8. The method of claim 1 further comprising the steps of, after searching said distribution for said predetermined content, searching said distribution for a second predetermined content and if said second predetermined content is found then associating a second acknowledgement option with said distribution before said distribution is sent.

9. The method of claim 1, further comprising the steps of:
   a) allowing said user to edit said predetermined content;
   b) said step of searching a distribution for a predetermined content further comprises the step of searching said distribution for a predetermined string;
   c) allowing a user of said data processing system to provide a type of acknowledgement option associated with said predetermined content; and
   d) if, after said step of searching said distribution said predetermined content cannot be found, then sending said distribution without said acknowledgment option.

10. In a data processing system that allows the creation and transmission of a distribution from one user to another user thereon, said distribution being sent from a sender on said data processing system to a recipient on said data processing system, the improvement comprising:
- a) means for searching a distribution for a predetermined content; and
- b) means for associating an acknowledgment option with said distribution before said distribution is sent to said recipient if said predetermined content is found in said distribution, said acknowledgment option creating an acknowledgment that is sent back to said sender after said distribution has been sent to said recipient and upon the occurrence of a specified event.

11. The data processing system of claim 10 further comprising means for allowing a user of said data processing system to provide said predetermined content.

12. The data processing system of claim 11 further comprising means for allowing said user to edit said predetermined content.

13. The data processing system of claim 10 wherein said means for searching a distribution for a predetermined content further comprises means for searching said distribution for a predetermined string.

14. The data processing system of claim 10 further comprising means for allowing a user of said data processing system to provide a type of acknowledgement option that is associated with said predetermined content.

15. The data processing system of claim 10 wherein said means for searching a distribution for a predetermined content further comprises means for searching said distribution for plural strings joined together with logical operators.

16. The data processing system of claim 10 further comprising means for sending said distribution without said acknowledgement option if said predetermined content cannot be found in said distribution.

17. The data processing system of claim 10 further comprising means for searching said distribution for a second predetermined content and for associating a second acknowledgement option with said distribution before said distribution is sent if said second predetermined content is found.

18. The data processing system of claim 10 further comprising:
- a) means for allowing said user to edit said predetermined content;
- b) said means for searching a distribution for a predetermined content further comprises means for searching said distribution for a predetermined string;
- c) means for allowing a user of said data processing system to provide a type of acknowledgement option associated with said predetermined content; and
- d) means for sending said distribution without said acknowledgement option if said predetermined content cannot be found.

* * * * *